(12) United States Patent  (10) Patent No.: US 8,997,162 B2
Stallard  (45) Date of Patent: Mar. 31, 2015

(54) RESOURCE ALLOCATION FOR VIDEO ON DEMAND

(75) Inventor: Paul Stallard, Chichester (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/579,644

(22) PCT Filed: Feb. 17, 2010

(86) PCT No.: PCT/EP2010/051960
§ 371 (c)(1),
(2), (4) Date: Aug. 17, 2012

(87) PCT Pub. No.: WO2011/101023
PCT Pub. Date: Aug. 25, 2011

(65) Prior Publication Data
US 2012/0317604 A1  Dec. 13, 2012

(51) Int. Cl.
*H04N 7/173* (2011.01)
*H04L 29/06* (2006.01)
*H04L 12/26* (2006.01)
*H04L 29/08* (2006.01)

(52) U.S. Cl.
CPC ........ *H04L 65/4084* (2013.01); *H04L 12/2671* (2013.01); *H04L 65/80* (2013.01); *H04L 67/32* (2013.01)
USPC ............................................. 725/95; 725/96

(58) Field of Classification Search
USPC .................................... 725/95, 96
See application file for complete search history.

(56) References Cited

U.S. PATENT DOCUMENTS

| 2005/0039213 | A1* | 2/2005 | Matarese et al. ................. 725/95 |
| 2006/0206600 | A1* | 9/2006 | Wong et al. ..................... 709/223 |
| 2007/0147346 | A1 | 6/2007 | Gilmartin |
| 2009/0282440 | A1* | 11/2009 | Rodriguez ...................... 725/60 |

FOREIGN PATENT DOCUMENTS

WO  WO 2005/020556 A2  3/2005

OTHER PUBLICATIONS

International Search Report for PCT/EP2010/051960, mailed Jun. 24, 2010.

* cited by examiner

*Primary Examiner* — Nasser Goodarzi
*Assistant Examiner* — Michael Hong
(74) *Attorney, Agent, or Firm* — Nixon & Vanderhye P.C.

(57) ABSTRACT

A video on demand system has a video server (200) for outputting video streams requested by users, via a core network (620) and access networks (630, 640, 650). A resource manager (600) determines occupation information concerning how much of the previously allocated capacity is occupied by previously authorized video streams is determined before authorizing transmitting a new requested video stream. By checking there is sufficient core network capacity, a risk of disrupting existing video streams or causing other problems by overloading the allocated capacity, is reduced or avoided. Thus less capacity in the core network is needed, and so costs of such capacity can be reduced and there is increased confidence that demand peaks will be handled more gracefully. By checking without obtaining occupation information from the core network, the system can be more independent of the core network, to reduce costs of a real time interface to the core network.

20 Claims, 11 Drawing Sheets

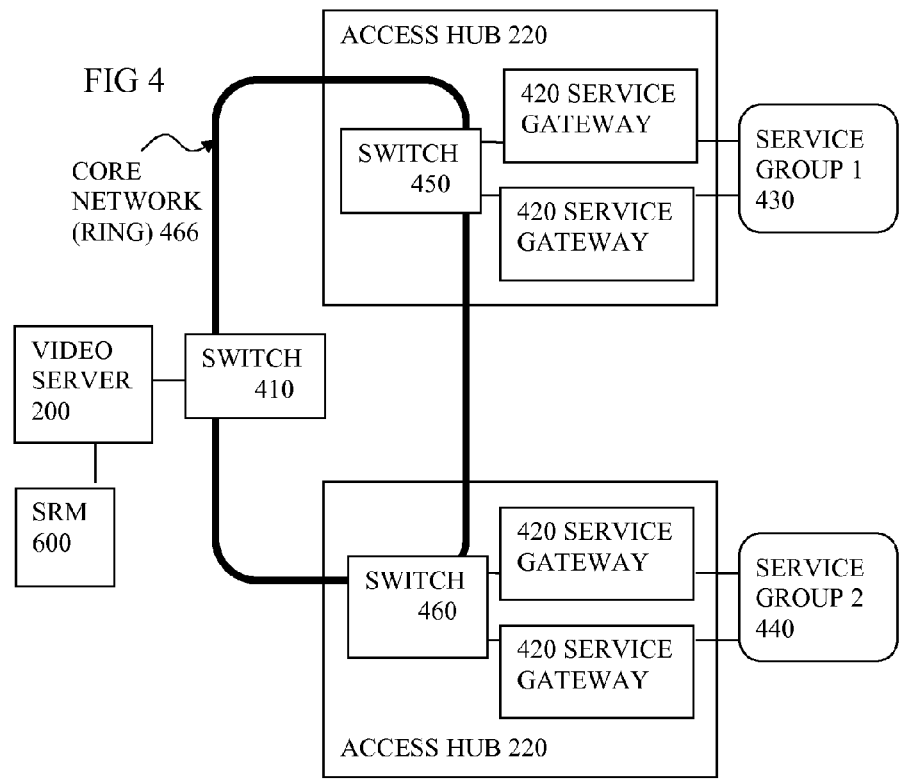
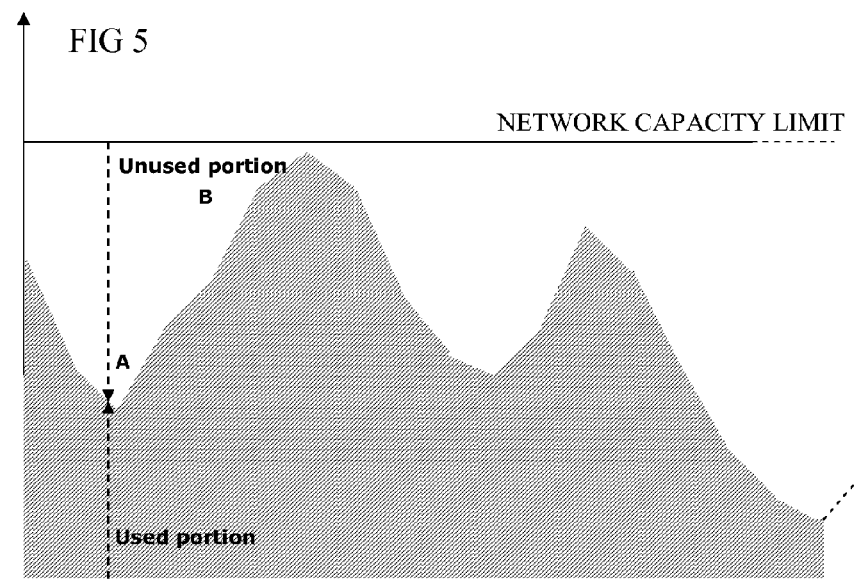

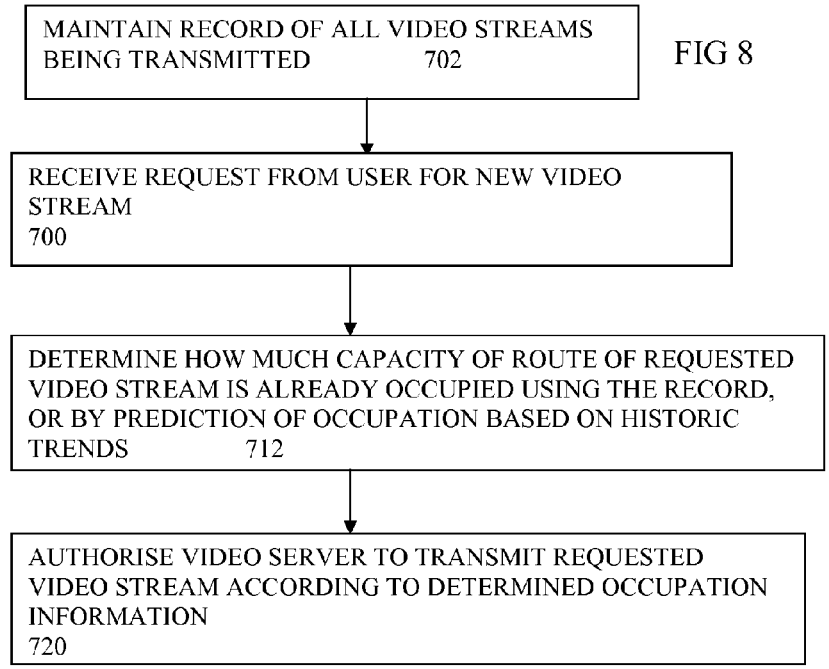
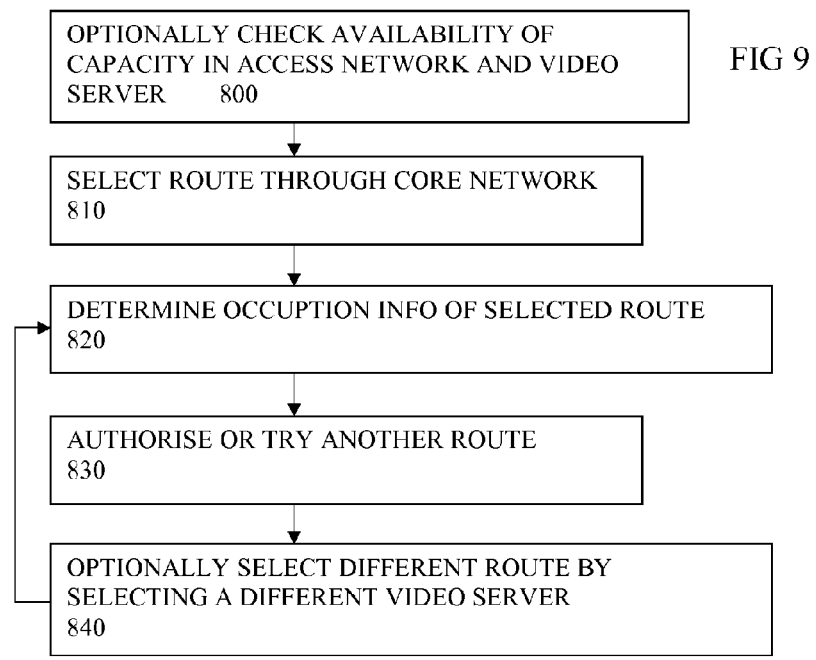

RESOURCE ALLOCATION FOR VIDEO ON DEMAND

This application is the U.S. national phase of International Application No. PCT/EP2010/051960, filed 17 Feb. 2010, the entire contents of which is hereby incorporated by reference.

FIELD OF THE INVENTION

This invention relates to video on demand systems, to resource managers for such systems, to methods of operating a video on demand system, to corresponding programs, and to corresponding methods of using a video on demand system.

BACKGROUND

Modern cable television systems have evolved over many years to provide enhanced services as new technologies have emerged. Whilst the same network infrastructures and topologies are used additions such as optical fibre have been deployed to improve performance. Digital technologies have also made a significant impact in recent years and have been added compatibly to existing analogue systems offering better exploitation of the network resources and the introduction of new services. One such new service type is Video on Demand [VOD] which allows viewers to select specific content from a list and have it streamed to them for immediate viewing.

However the delivery of such a new service places new demands on the management of the network and its resources whose basic traditional structure is defined by fixed assets that convey a set of pre-determined content packages to viewers. This is achieved by means of a delivery network having several components:

Content storage resources (video servers) at one or more network nodes, a core network to connect such video servers to access hubs (such as local cable head ends), an access network that connects consumers with the access hubs, and network management resources to control the delivery of services.

The access network can be for example one or more cable networks, which typically use a wide frequency band divided into RF channels each of which carries an analogue or digital signal. The analogue channels carry one service per channel but the digital ones carry a multiplex using Quadrature Amplitude Modulation [QAM] comprised of several services carried by separate digital streams. Normally all viewers' receivers are able to receive all the RF channels [subject to any controlled access service constraints] and hence all services regardless of where they are located geographically in the local area. However not all viewers gain their service from the same head end hardware resource. In small systems this may be possible but in more typical systems, especially those serving large communities, the viewers are grouped, e.g. geographically, so that they share hardware resources in small numbers appropriate to service management criteria. The viewer uses an on-screen schedule list, the electronic programme guide, to see the available services and makes a selection from it. The receivers locate each requested service by means of a combination of RF channel selection and digital content stream identity. Typically the normal analogue and digital TV services and the new VOD services are carried in separate identifiable RF channels some of whose QAM modulation equipment at the head end is dedicated to VOD.

A traditional large cable TV network typically offers a fixed set of broadcast services thus requiring known and substantially fixed network resources. The introduction of VOD services into such a traditional network raises two requirements: the provision of additional variable capacity in the core network to deliver the requested on-demand services and resources in the local network to convey the requested content to the viewers. Despite the use of IP based technology in the core networks, the capacity in these core networks to be allocated to the cable TV service is typically limited and may not necessarily allow for dynamically variable capacity. It may be limited by physical capacity limitations of the core network, or by a need for some of the capacity to be allocated by the cable service provider to other non VOD services. In cases where the core network is provided by a third party, then there may be an agreement which limits how much capacity is allocated to the cable service provider. Such agreements are often based on a fixed capacity within which the cable TV service providers must manage their services.

Thus, it is possible that there are times when the access network carries no VOD services at all [when no viewer attached to it has requested VOD] and other times when demand from viewers in the access networks reaches a peak. The allocation of bandwidth for VOD in the core and access networks must be large enough to accommodate the expected peak demand.

In modern digital cable systems offering VOD services, there is a resource manager often called a Session Resource Manager [SRM] which maintains an activity map of the system and is responsible for allocating resources, including QAM bandwidth, for the delivery of an on-demand request originated by a particular viewer. For each new VOD request the SRM identifies an available Video Server that contains the requested content and a free VOD QAM channel that is available to the viewer such that all of the following constraints can be met:

The Video Server has the chosen content.

The Video Server has sufficient spare bandwidth to deliver the chosen content.

The QAM is reachable via the core network from the Video Server.

The QAM can reach the user's service group in the user's access network.

The QAM has sufficient spare capacity for the bit rate of the chosen content.

SUMMARY OF THE INVENTION

An object of the invention is to provide improved apparatus or methods. According to a first aspect, the invention provides:

A video on demand system having a video server for outputting video streams requested by users, for transmission to respective users over a core network and over access networks, the core network having a predetermined amount of transmission capacity allocated to the video on demand system, and the video on demand system having a resource manager arranged to determine occupation information concerning how much of the previously allocated capacity is occupied by video streams already authorized for transmission, without obtaining such occupation information from the core network. The resource manager is also arranged to control the video server to transmit a new requested video stream according to the determined occupation information.

By having this capability to check there is sufficient core network capacity, a risk of disrupting existing video streams or causing other problems by overloading the allocated capacity, is reduced or avoided. As a consequence, the allocated capacity can be less than the theoretical maximum aggregated demand, as the service provider knows that in the event of demand exceeding capacity occasionally, the request will be gracefully denied. Hence the costs of providing such core network capacity can be reduced. Furthermore, by checking whether there is enough available capacity without obtaining current occupation information from the core network, the system can be more independent of the core network. This degree of independence can help avoid or reduce the costs of providing, testing and maintaining a real time interface to the core network, and can enable the system to be adapted more easily to different core networks, or to be used with simpler core networks which don't provide current occupation information. Furthermore in some cases it can reduce costs by avoiding a need to pay a premium for network capacity which is monitored or has admission control provided by the core network itself using quality of service enabled routers for example.

Any additional features can be added to those discussed above, and some are described in more detail below.

Another aspect of the invention can involve a resource manager for managing resources in a video on demand system as set out above. Another aspect can involve a method of operating a video on demand system as set out above. Another aspect can involve a program stored on a machine readable medium, and having instructions which when executed by a processor, cause the processor to carry out the method of operating the system. Another aspect provides a corresponding method of using a video on demand system, the system having a video server for outputting video streams requested by users, for transmission to respective users over a core network and over access networks, the core network having transmission capacity previously allocated to the video on demand system, and the method involving sending a request by a user for a new video stream, to the system, to cause the system to determine occupation information concerning how much of the previously allocated capacity is occupied by video streams already authorised for transmission, without obtaining such occupation information from the core network. This also causes the system to authorize the new video stream to be transmitted, according to the occupation information. The authorized video stream is then received from the system by the user for presentation to the user. Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 3 and 4 show schematic views of networks suitable for VOD systems, FIG. 5 shows a graph of variation of demand for video streams over time, FIG. 8 shows steps in an alternative embodiment, FIG. 9 shows steps according to other embodiments.

DETAILED DESCRIPTION

Figure 1:
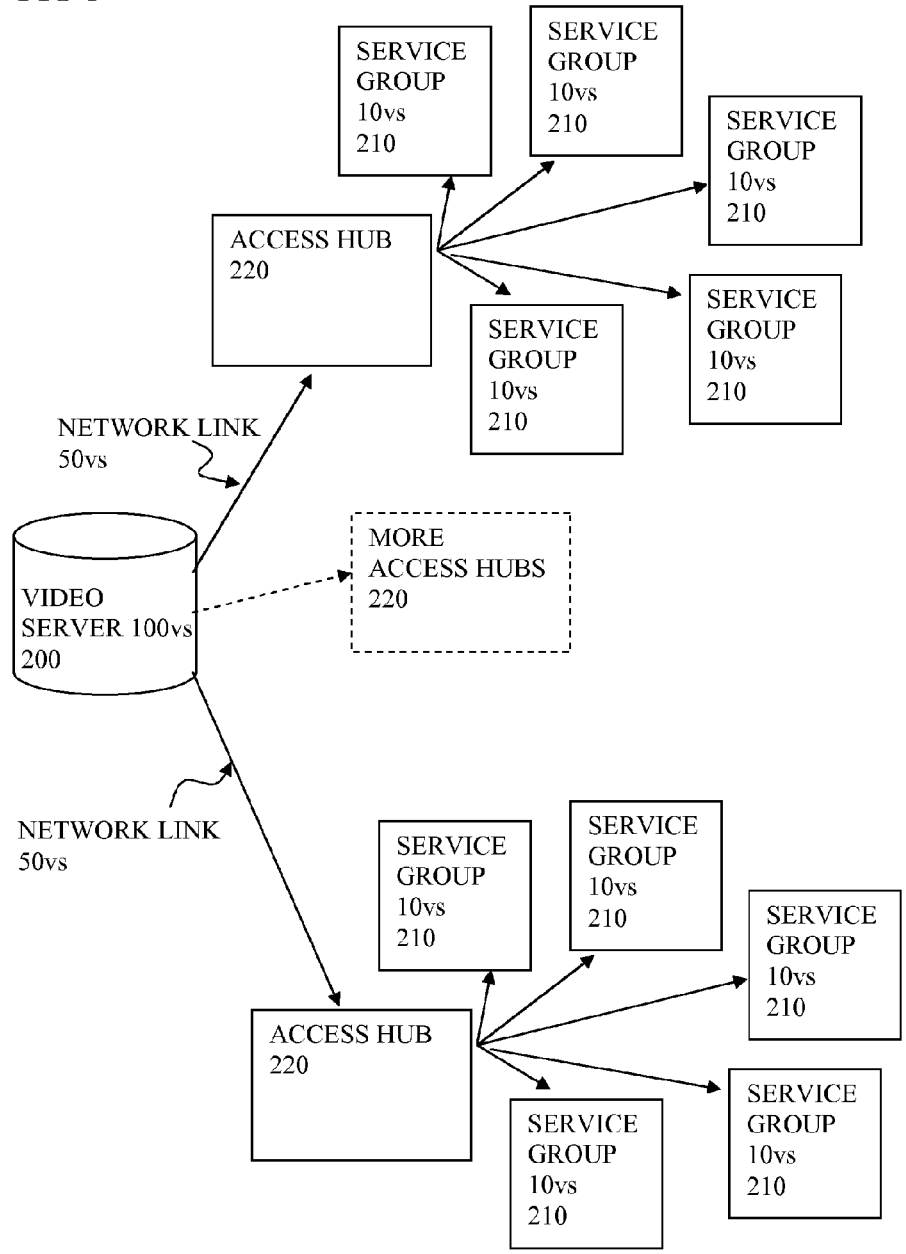
FIG. 1 shows an example of a VOD system showing capacity according to a conventional planning assumption.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to computer readable media can encompass any tangible media, not including transitory signals.

References to hardware, processing hardware or circuitry can encompass any kind of logic or analog circuitry, integrated to any degree, and not limited to general purpose processors, digital signal processors, ASICs, FPGAs, discrete components or logic and so on.

References to video streams can encompass any kind of video stream of any resolution or frame rate or interlace format or coding, scrambled or unscrambled, and in particular encompasses digital streams representing a video signal in real time or near real time, and having a substantially constant bit rate. They are normally accompanied by one or more audio streams, and may be accompanied by subtitles and other ancilliary streams. The video streams can be used to present audio only, with no visual content.

References to previously allocated can encompass allocation in the sense of how much capacity was physically installed, or allocation of a proportion of the capacity by a third party core network operator by agreement or by allocation by the VOD service provider between VOD services and other services such as broadcast or data services. The allocation can be done any time prior to the decision to authorize the new request.

References to a core network can encompass any kind of network for coupling one or multiple video server sites to one or multiple access networks, for example it is typically a wide area network giving regional or metropolitan or national coverage. It can encompass shared networks or networks dedicated to or owned by the service provider.

References to an access network can encompass any kind of network used for transmitting video streams over the last link to individual locations of users, for example cable access networks, DSL type networks and mobile networks.

References to occupied can encompass any kind of indication of occupation, at any resolution or granularity, in relative or absolute terms, either instantaneous or averaged over a suitable length of time, and can encompass a level expressed in terms of capacity occupied, or capacity not occupied, that is a level of availability, whether the previously allocated capacity is predetermined or variable.

References to user parameters can encompass any one or more of: whether the user has a priority service level, whether the user has a quantity limited tariff, a credit status of the user and so on.

References to system condition can encompass whether the occupation of the dedicated capacity is approaching a capacity threshold, fault conditions in the network, or in the system, anticipated demand peaks, observed or anticipated external events, such as power outages, and so on.

References to a characteristic of the request can encompass for example whether the request is for free content or chargeable content, for a higher resolution video stream, a 3D format video stream, whether the request is immediate or for delivery later, and so on.

Introduction

By way of introduction to the embodiments, some issues with conventional designs will be explained.

There is an implicit assumption that there is sufficient bandwidth in the core network for the Video Server to deliver the selected content to the QAM and thence to the viewer. The core network is conventionally regarded as simply linking the one or more video servers to access networks in the form of QAM equipment or other types, with an amount of capacity to meet the aggregate bit rate demand. Conventionally the SRM does not model this core network and it is typical of current systems that the planning assumptions lead to overprovision of the capacity of the core network allocated to the VOD system.

FIG. 1, Conventional Fully-Provisioned System

Unlike the traditional system of delivery for broadcast services, VOD systems are not scaled to be capable of delivering an individual VOD service to every user concurrently. In practice, only a percentage of the users will be actively watching VOD at any one time. Peak usage varies by operator but is typically between 5% and 10%; this is known as the contention ratio. For 100,000 users therefore, the operator would deploy a system capable of delivering between 5,000 and 10,000 concurrent streams. These numbers are for illustration only, embodiments can be applied to systems of any practical size.

In the access network there can be QAM equipment for example which is allocated to each service group in sufficient numbers to sustain the maximum designed contention ratio, that is, one QAM for every 10 to 20 concurrent video streams required, this group being known as a QAM User Group. These subscribers share this hardware resource which is not accessible by any other group. 10-20 concurrent streams in a QAM channel implies one QAM is required for every 100 to 400 subscribers in a group, assuming the 5-10% contention ratio mentioned earlier.

This number of concurrent video streams may change in the future with better video encoding and/or different QAM schemes. Similarly it will be different if some of the streams are for audio only, which will use less bandwidth and therefore enable more streams per QAM.

Traditionally, the Video Server infrastructure at the content source end of the network is then scaled such that it can deliver the total quantity of all the streams supported by the QAM population. Thus, for example in FIG. 1, where there is capacity for 10 concurrent streams per service group of users Group 210 and 5 such Service Groups for example, then the core network should have capacity for 50 simultaneous VOD services (vs), as shown by the network link marked with an allocated capacity of 50 vs. Also the Video Server 200 needs to have capacity for transmitting these 50 video streams simultaneously. If there is more than one Access Hub, serviced by the Video Server, as shown, then the Video Server capacity needs to be greater, by another 50 services in this case, to make a total of 100 vs. Also, an additional core network link with allocated capacity of 50 vs, meaning 50 simultaneous services is also required, as shown in FIG. 1. This figure shows that it is relatively inefficient to provide core network capacity for a worst case of expected demand levels, so it is desirable to provide a reduced allocated capacity in the core network to meet aggregated peak demands in all the access networks.

Figure 2:
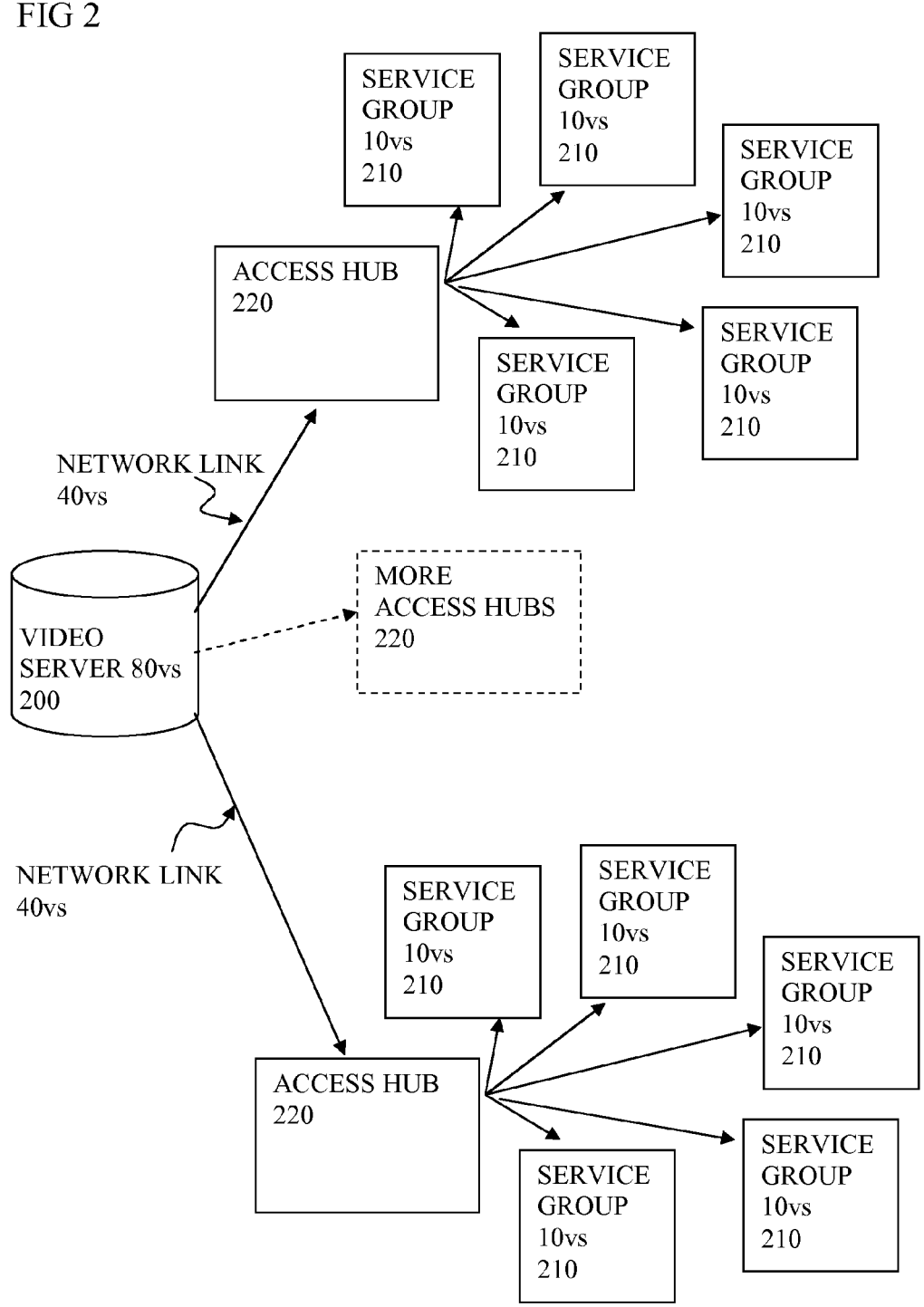
FIG. 2 shows a scaled down capacity example of a similar VOD system.

FIG. 2, Scaled Down Capacity Example

FIG. 2 shows a similar system to that of FIG. 1, and corresponding reference numerals have been used. These planning assumptions explained for FIG. 1 allow for the support of each QAM User Group to be fully active simultaneously thereby assuming a corresponding loading on the Video Server. However, it has been observed that scaling the Video Server in this way is unnecessary because, in practice, the links to each access hub will not all reach maximum demand simultaneously. These currently applied planning assumptions ultimately lead to inefficient provision of server capacity. In a more typical system with links to tens or hundreds of access hubs, it is evidently true that statistically the demand is very unlikely to peak at the same time in all these links. An industry rule of thumb is that the Video Server can be scaled down by as much as 30% from its peak theoretical scaling. For example, if the sum of the QAM population can support 100,000 concurrent streams, the Video Servers capacity could be scaled for a little as 70,000 streams because not all QAMs are not fully active all the time. This results in the example illustrated by FIG. 2 where the Video Server capacity is reduced to 80 from the 100.

Similarly, the same theoretical planning principles could be applied to the provision of core network capacity leading to sub-optimal provision of capacity in the core network between the Video Server and the QAMs. In a fully provisioned core network scenario all services agreed by the Video Server and the subscribers can always be supported by the network but this is statistically unnecessary as was the case with the Video Server and it should be possible to provide a system having allocated capacities as illustrated by FIG. 2 where the core network link capacities are reduced from 50 to 40 video streams. But this can lead to a problem, as will now be explained. Whereas the Video Server is inherently part of the managed content supply infrastructure and can therefore be controlled by the service provider using the SRM, the core network is not so controlled. In the managed provision QAM scenario, the scaled down Video Server may occasionally run out of capacity and be unable to fulfill a stream request but this is done under control such that the video server cannot be overloaded, so existing VOD services in play are not affected by additional requests for service.

Therefore, because the SRM has no direct knowledge of the state of the core network, there is a problem with a simple attempt to reduce the capacity of the core network allocated to the VOD system, by assuming statistical factors without knowledge of the core network loading. If this capacity allocation were reduced as shown in FIG. 2, and additional capacity was needed as a result of additional agreed supportable service requests, the failure case could result in the core network being congested with unpredictable packet queuing or packet loss, leading to unpredictable service interruptions to all existing streams, or at least those delivered by the part of the core network which has been over committed.

Accordingly, it has now been appreciated that the VOD system needs a means of managing the provision of VOD when demand exceeds allocated capacity, in the access network or in the core network or both. There is also need to ensure that failures and planned maintenance can be dealt with conveniently and effectively and so the planning of resources for VOD adds dimensions to cable network provisioning rules that do not exist in traditional broadcast service provision.

Features of Some Embodiments of the Invention

By providing some means of modelling and managing the allocated capacity of the core network from within the SRM system, its total capacity allocated to the VOD system can be reduced with a reduced risk of unwanted uncontrolled consequences for the VOD service as a whole. This knowledge is not usually available from the core network provider and if it were to be negotiated it would be provided at a high cost and so some internal method of capacity management is required. Some embodiments of the invention can use a simple network model which can be incorporated into existing SRMs without a fundamental change. Examples will be explained in more detail below with reference to FIGS. 9 to 12. The model allows core networks to be handled in a managed way by providing a method for defining more complex network infrastructures and allocating resources correctly within them. By modelling the system capacity to deliver services in terms of "Stream Paths" in some embodiments, rather than in global capacity terms, it is possible to manage its allocation more effectively. This can enable the total allocated capacity needed to support the VOD service to be reduced, and hence reduce its cost.

For mixed core networks where the VOD services share the network with other dynamic services, it would be expected that the SRM would forego its own network model and negotiate network resources with an external policy server. However, this is not normally possible and so for dedicated VOD networks, or networks where a portion of bandwidth is statically allocated to VOD, the Stream Path model provides the SRM with a simple and effective way to model the network.

Figure 3:
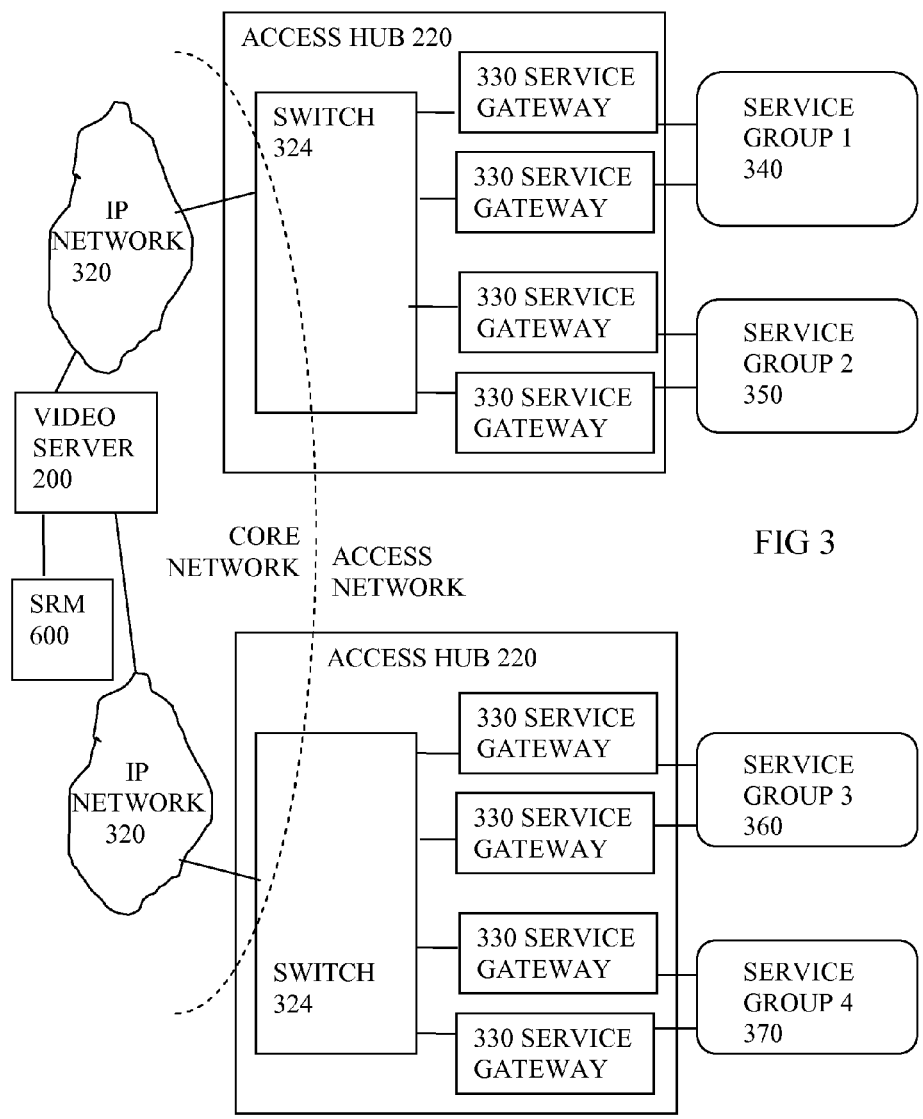

The VOD delivery system is illustrated generically by FIG. 3. In this figure, there is one video server shown, coupled via a core network which may be in the form of an IP network 320 to access hubs 220. These hubs each may have a switch 324 to couple service gateways 330 which may be implemented in the form of QAM units or DSLAM units or wireless base stations for example, depending on the type of access network. Two of the service gateways feed a service group 1 340, to provide sufficient capacity to meet expected demand. The service group might serve 50 to 100 users typically. The service gateways and the service group together form an example of an access network, and the switch 324 is regarded as the boundary between the core and access networks in this case. Another access network is shown in the form of another two service gateways 330 feeding service group 2, 350. Similarly, the second of the access hubs shown has connectivity to service group 3, 360 via two service gateways 330, and has connectivity to service group 4, 370 via another two service gateways 330. Of course there may be more service gateways for each service group, more service groups, more video servers and so on. The topology of the possible paths for the video streams is essentially hierarchical or tree-like in this example, but other topologies can be envisaged of course.

A single SRM 600 may be used to authorize transmissions of the video streams to avoid overloading the access hubs or the service groups or the video servers as discussed above. As there are two service gateways which can reach any service group, the SRM can be arranged to decide which service gateway to use for a new request, to achieve load balancing of the QAMs, as desired. The SRM can be one which is arranged according to an embodiment of the invention, as will be described in more detail below with reference to FIGS. 6 to 12.

For the purposes of description of the network modelling according to some embodiments of the invention an alternative topology is illustrated in FIG. 4, which shows a typical ring architecture for the core supply network. In this case the video server 200 feeds a first switch 410 on the ring, and the ring has two further switches 450 and 460, where video streams can be dropped from the ring to reach access hubs 220. As before, each access hub has a switch for coupling service gateways 420. Two service gateways 420 are shown coupled to switch 450 and for coupling video streams to service group 1, 430. Another two service gateways 420 are shown coupled to switch 460 and for coupling video streams to service group 2, 440. Assuming that each service gateway has capacity for 20 streams, and that 2 service gateways can reach all viewers in a service group this system can support a maximum of 40 streams per service group, and 80 in total. The Video Server will not be required to deliver all 80 services simultaneously and so a rule of thumb suggests that on a statistical basis it could be scaled down from 80 services to say 60 for example. That is, although the QAM infrastructure can satisfy 80 separate requests for VOD services, not all of these will be required in practice.

A resource manager SRM 600 is shown coupled to the video server. In practice, a single SRM would be provided to control many, perhaps tens or even hundreds of video servers.

In a similar fashion, the total network demand for the VOD service in this example is statistically variable as illustrated by the graph of FIG. 5, which shows a typical variation of demand for VOD over time, such as over the course of a couple of hours. Here it is clear that a fixed allocation of capacity set by maximum demand is consistently excessive. Thus, it should be possible to have a core network capacity allocation lower than the theoretical worst case aggregate demand of all the access networks. However, if this reduced capacity is implemented without any knowledge of the core network, there is a risk of congestion somewhere in the network and consequential disturbance to services already authorised.

Figure 6:
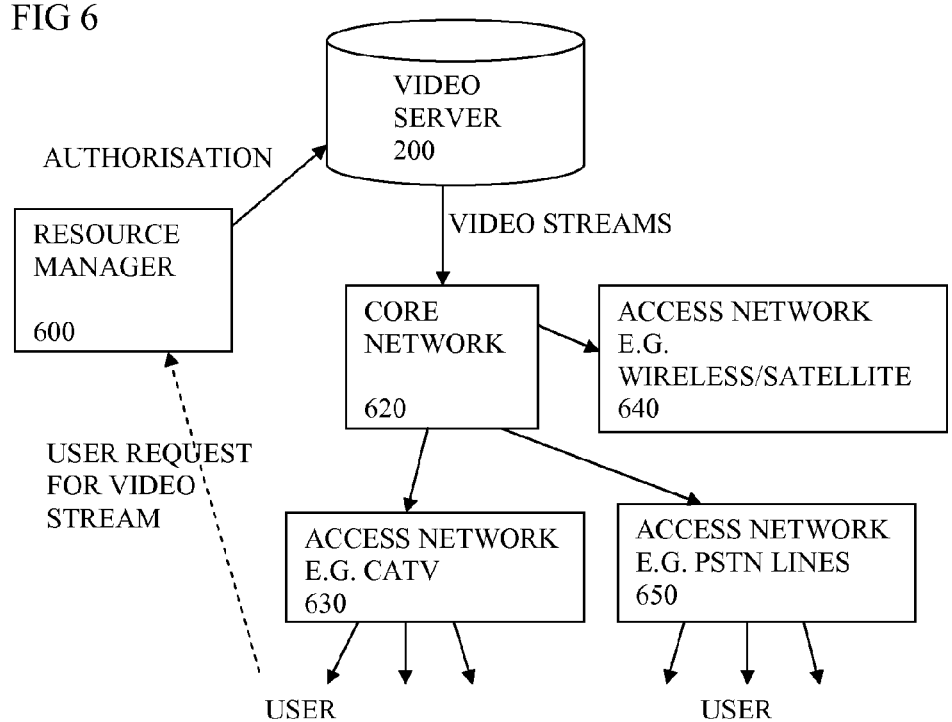
FIG. 6 shows a schematic view of an embodiment.
Figure 7:
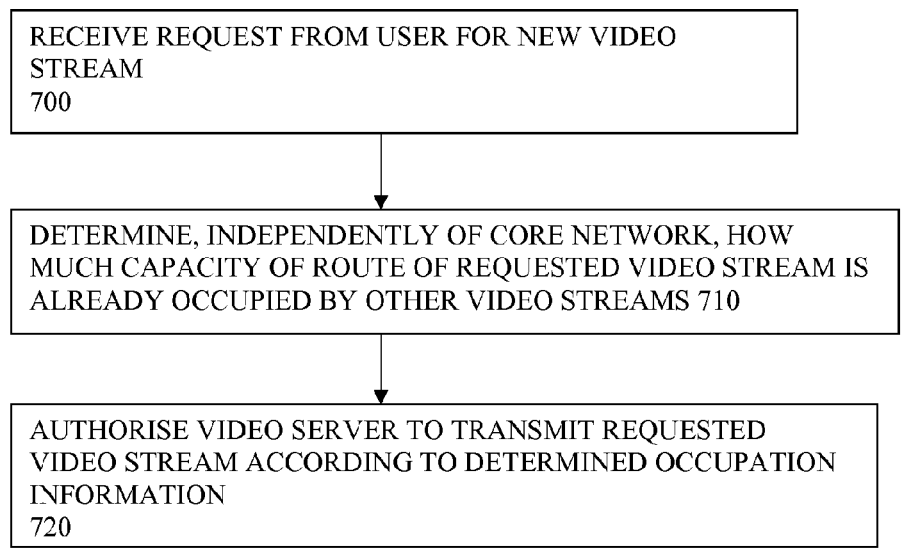
FIG. 7 shows steps in operating the system of FIG. 6 or other embodiments.

FIGS. 6, 7 System According to an Embodiment.

FIG. 6 shows an example of a VOD system having a video server 200, and a core network 620 coupled to any one or more of a number of access networks 630, 640, and 650. FIG. 7 shows some steps in the operation of the embodiment of FIG. 6 or of other embodiments. The video server can be arranged to output video streams in the form of MPEG-2 Single Program Transport Streams over IP (Internet Protocol)/Ethernet, or using other streaming formats. The video may be compressed using MPEG-2, MPEG-4 or other compression methods for example.

The core network can be a wide area network or networks such as those already used by telecom operators for connecting telephone exchanges or for trunk routes between internet routers. Typically, high capacity links of such networks use packet based network layer technologies over optical base physical layers. In some cases the access networks can be CATV networks, in other cases the access networks can use PSTN lines, typically using a digital subscriber line technology such as ADSL or other. In some cases the access network can involve wireless networks such as satellite links or cellular networks arranged to carry digital video streams, typically using some compression techniques.

A user sends a request for a new video stream. This is received at a resource manager 600 as shown by step 700 of FIG. 7. The resource manager is arranged to authorize transmission of requested video streams to occupy the allocated transmission capacity, and to determine occupation information of the previously allocated capacity by video streams authorised for transmission, at step 710 without obtaining such current occupation information from the core network. The resource manager then authorizes transmitting a new video stream according to the determined occupation information, at step 720, typically by sending an authorization indication to the video server. Many other steps or features can be added in different embodiments. The resource manager can be co located with the video server or can be remote from the video server. More details of possible implementations can be seen for example in WO 2005020556, "optimal provisioning and management of bandwidth in a video-on demand services architecture".

FIG. 8 shows another embodiment similar to that of FIG. 7, and having some further optional features. In FIG. 8 there is a preliminary step 702 of maintaining a record of all video streams being transmitted. The determining of how much capacity is already occupied is a step 712 of determining it using the record of the video streams being transmitted, or by a prediction of occupation based on historic trends for the same or other links or networks, and may be dependent on the time of day for example.

Some Additional Features of Different Embodiments

In some embodiments, the resource manager can be arranged to determine a current availability of capacity in the access network and in the video server, and authorize the new requested video stream according to these determinations. This can provide corresponding advantages in terms of reduced allocations of capacity or more graceful handling of demand peaks, and thus improve the balance between costs of capacity, and availability of the service. This can provide authorization for more of the path of the video stream, and in some cases all of the path from end to end.

In some embodiments, the resource manager can be arranged to select a route for one or more of the video streams through the core network in the case that there is more than one possible route. This can enable some degree of load balancing to better match demands for video streams to the available capacity, or to reroute in case of faults or other bottlenecks in the core network for example.

In some embodiments, the system can have more than one video server coupled to be able to transmit a requested video stream to a corresponding one of the users over different routes through the core network, and the route selecting can involve selecting which of the video servers to use for the respective requested video stream. This is a useful example as the route can be selected without needing to control switching in the network. This means the advantages of route selection can be obtained while reducing or avoiding the costs involved in maintaining a control interface with the network, or using networks which don't offer such capabilities.

In some embodiments, the resource manager can be arranged to maintain a model of nodes and links between the nodes to represent the core network, the model indicating connectivity and capacity of the links, and the resource manager being arranged to use the model in determining occupation information of the allocated capacity. By having a model, the occupation information can be tracked more easily, and in cases where routing is determined, a routing algorithm can be maintained separately from information about the network topology. This means that the algorithm need not be changed as the network changes over time, only the model need be updated, thus making it easier to maintain the resource manager.

In some embodiments, the model can comprise a stream path for each link, indicating the occupation information of that link, and which of the access networks or stream paths can be reached from that link, and the resource manager can be arranged to determine the occupation information of a possible route by reference to the stream paths making up the route. Such stream paths can help provide a simplified version of the topology of the network, so that most types of topology can be accurately modeled. Stream paths can help reduce the complexity of calculation of routes and of occupation information for more complex networks.

In some embodiments, at least some of the stream paths have a priority indication, and the resource manager can be arranged to select from the possible routes according to the occupation information and the priority indications of the stream paths along the route. This can enable load balancing to reduce bottlenecks, or can enable maintaining unbalanced loading to keep some links clear for redundancy or other purposes.

In other embodiments, the resource manager can be arranged to make the authorization according to any one or more of: a characteristic of the request, a parameter of the respective user, and other conditions of the system. This can also enable better use of the allocated capacity.

The access network can comprise any of: a cable access network, a PSTN subscriber line based access network, and a wireless network. In some case the user may request that the VOD server controls a running stream to give functions such as: pause, rewind, fast forward, slow play, slow rewind, and so on.

FIG. 9, Other Embodiments

FIG. 9 shows some steps according to another embodiment. At step 800 the preliminary step of optionally checking whether there is availability of capacity in the access network and the video server is carried out. Then the resource manager may select a route though the core network at step 810. The current occupation information of the selected route can be obtained at step 820 for example by keeping track of the video streams already authorized and still running, or making estimates based on previous experience or historic statistics, for the same time of day, without needing input from the core network itself.

The resource manager authorizes the request or seeks a different route, as shown by step 830. Optionally the different route can be selected by finding a different video server which has a different ingress point to the core network, but still has connectivity to the access network of the respective user, shown by step 840. This will inherently mean that a different route through the core network is taken, without needing to indicate a route to the core network. There are various ways of arranging these steps, for example all the possible routes could be identified before determining occupation information of the possible routes, or the occupation information could be determined for the first route found, and other routes could be sought only if the occupation information is not sufficient for authorization.

However, as the network topology becomes more complex, so does the issue of preventing congestion without having to resort to a fully resourced network. There are now several more routes from the Video Server to the service groups and means thereby to aggregate the total demand over these several routes.

The solution proposed is for the SRM to apply a new service delivery concept known as a Stream Path. A Stream Path is characterised by a bandwidth limit, a list of service groups that are directly accessible via the Stream Path, and a list of other Stream Paths that are accessible via the Stream Path. The SRM maintains a measure of the Stream Path bandwidth each time a VOD session is set up or closed down, as it does in existing systems for the QAM bandwidth. By allowing Stream Paths to reach other Stream Paths, and for service groups to be reachable by multiple Stream Paths, most network topologies can be accurately modelled. The SRM would also be aware of which Stream Paths were directly accessible to each Video Server.

The Stream Path concept also greatly helps performance in the event of network failure. By taking Stream Paths out of service in the SRM [either manually or via a monitoring system for example], the SRM can continue to allocate streams without overloading the remaining network segments.

Figure 10:
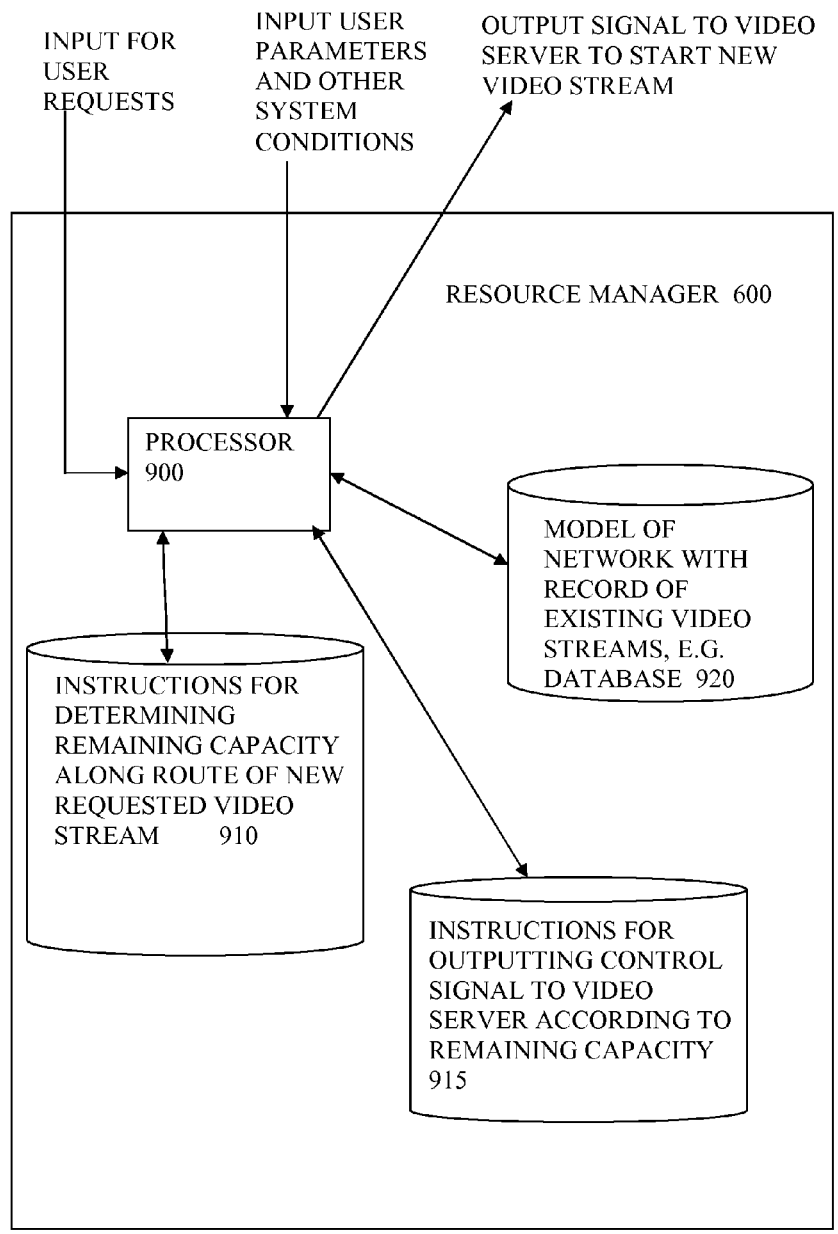
FIGS. 10 and 11 show an embodiment of a Resource Manager using stream paths.
Figure 11:
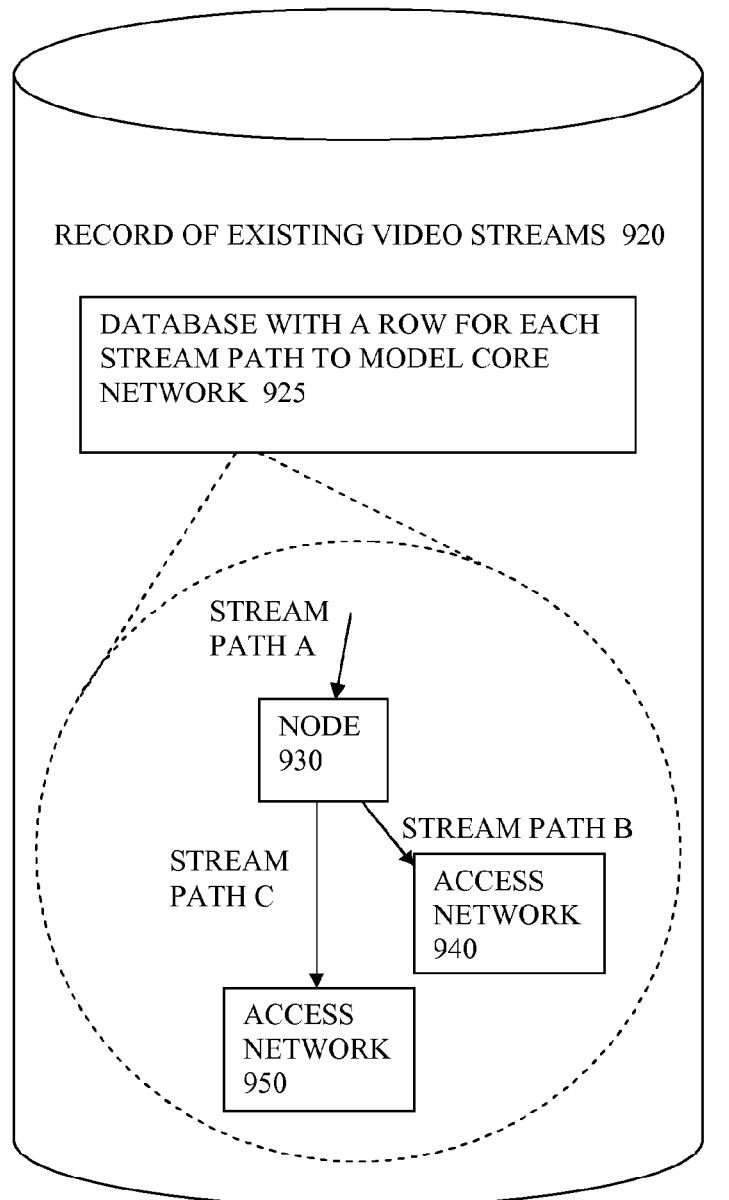

FIGS. 10, 11 Embodiment of a Resource Manager using Stream Paths

FIG. 10 shows a schematic view of an example of a resource manager. This can be used in the embodiment of FIG. 6, or in other embodiments. It includes a processor 900, a store 920 for storing a model of the core network with a record of existing video streams. There is also a store 910 for instructions for an algorithm to be executed by the processor to determine remaining capacity along a route of a new requested video stream. Also shown are stored instructions 915 for outputting control signals to the video servers, according to the remaining capacity. These parts can be implemented for example by a general purpose computer running software to act as a server, or can be implemented by application specific circuitry for example.

The stored model can be implemented as shown in more detail in FIG. 11, as a database 925 with for example a row for each stream path. This figure shows a representation of a part of the network topology, within dotted lines, illustrated even though in practice it can be stored as a list or table or other information format. Tables 1 and 2 described below show examples of such databases. The part of the network being modeled in this example has stream paths A, B and C, representing links in the core network. Stream path A is a link from a video server to a node 930. Stream path B represents a link from the node to a first access network 940. Stream path C represents a link from the node to another access network 950. Each stream path would have a row in the database, with columns indicating for example how much capacity is allocated, and how much is occupied currently.

The instructions store has instructions for an algorithm for determining a route as a sequence of stream paths, and determining occupation information of the route, and authorizing a new video stream to be transmitted according to a user request. The separation of the model from the algorithm helps enable each to be maintained separately. This enables the model to be adapted more easily to a new network or to changes in the network. The algorithm can also make the authorization dependent on other inputs such as user parameters (for example user preferences, user credit status, service level or service features offered to that user and so on). It could also be dependent on other system or external conditions such as time of day, fault conditions, anticipated demands, contractual conditions, prioritization of particular stream paths for load balancing or other reasons.

Figure 12:
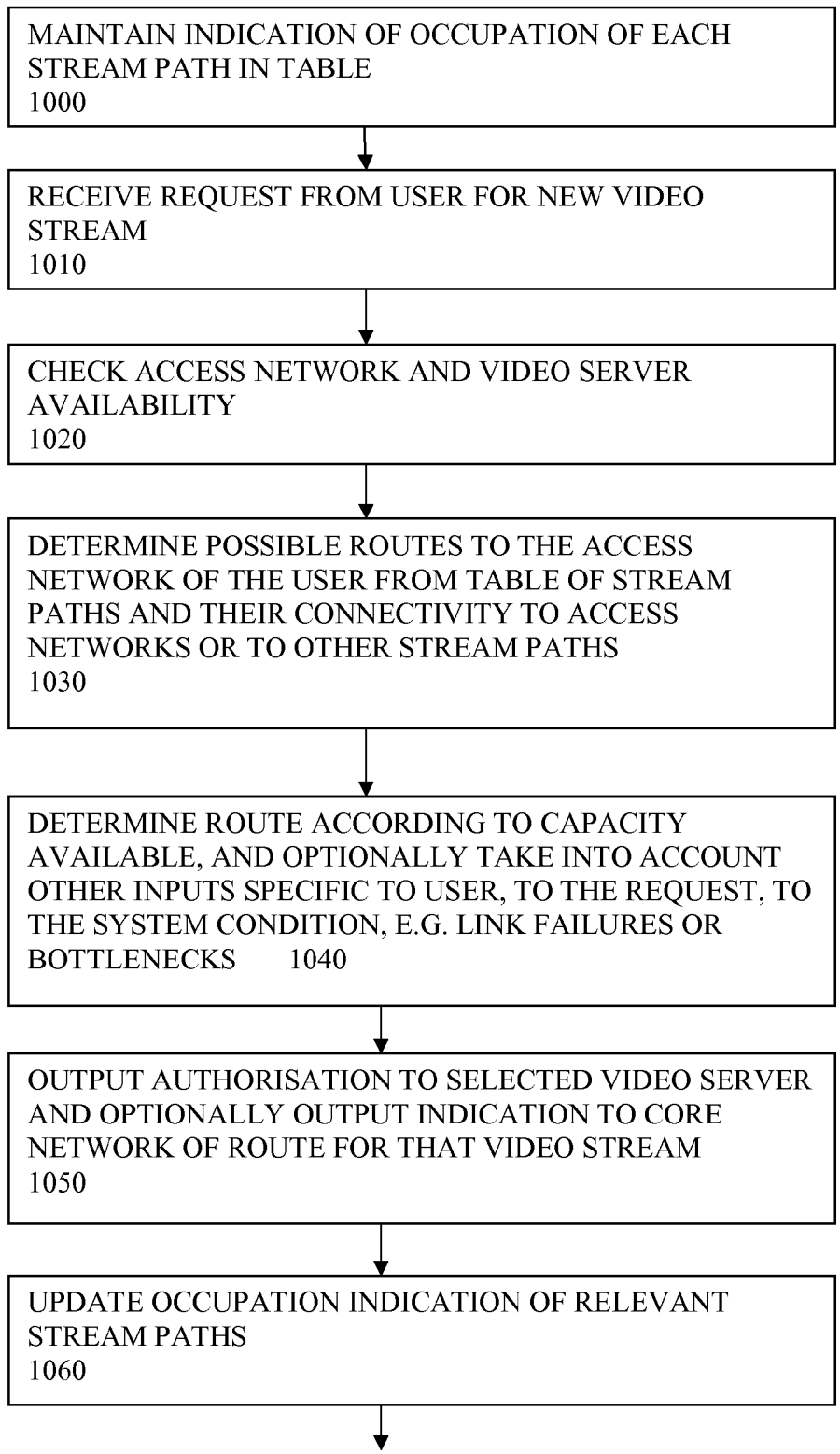
FIG. 12 shows steps according to another embodiment using stream paths.

FIG. 12, Steps According to an Embodiment Using Stream Paths.

FIG. 12 shows steps according to an embodiment using stream paths, steps taken by the resource manager of FIG. 10 or other embodiments. A preliminary step is to make a model of the core network, in the form of a table of stream paths as described above, and maintain this model at step 1000 by updating an indication of occupation information of each of the stream paths as video streams are authorized. The resource manager receives a request from a user for a new video stream at step 1010. An appropriate video server or servers which have the requested content are selected. A check is made on whether the access network and the selected video server have sufficient capacity available at step 1020. Then possible routes through the core network are determined from the table of stream paths, using the connectivity indicated for each stream path, shown by step 1030. At step 1040, if there are multiple routes, the SRM could choose the route with the most capacity available (load balance), the least capacity available (first fill) or any other selection algorithm. Optionally the selection could also take into account other factors such as user specific parameters, characteristics of the request, indications of system condition such as link failures, bottlenecks and so on.

At step 1050 an authorization is output to the selected video server. Optionally an indication is output to the core network to indicate a route for that video stream. This can be for example implemented by appropriate labels on the video stream if sent over a label switched network, or by an indication to a network management system or by direct interaction with routers of the core network. At step 1060 the model is updated by altering the indication of occupation of stream paths to take account of the newly authorized video stream.

Figure 13:
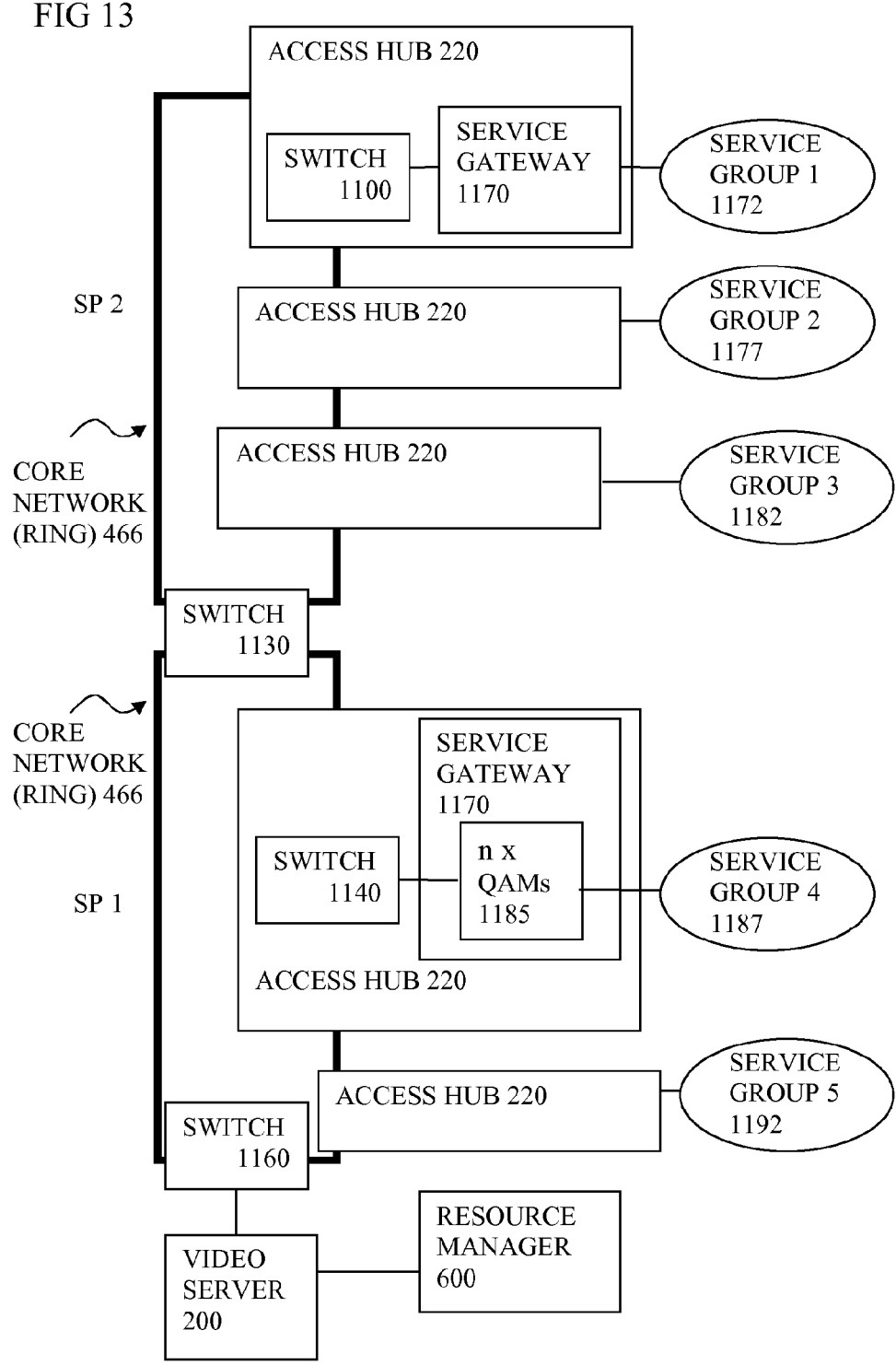
FIGS. 13 and 14 show further embodiments using stream paths.
Figure 14:
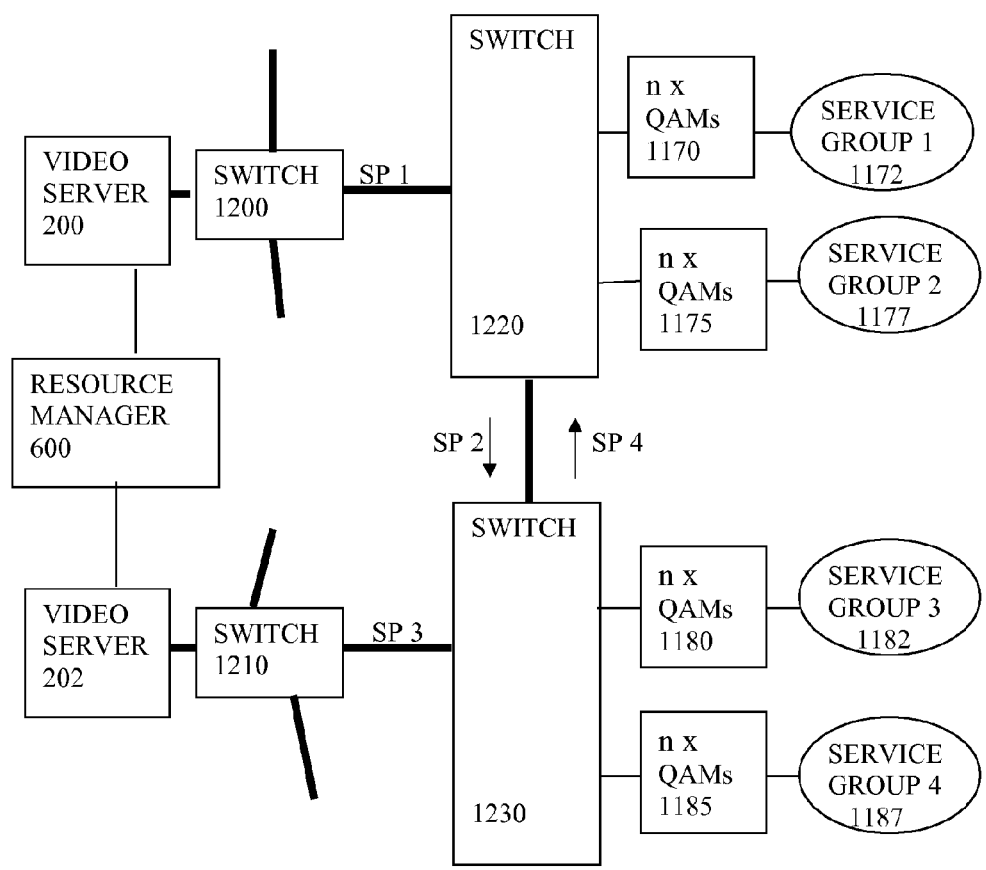

FIGS. 13, 14, Further Embodiments Using Stream Paths

These embodiments have further features which will now be described in more detail using examples of typical networks.

An example illustrated by FIG. 13 has labels showing the portions of network capacity allocated to each of the Stream Paths. There are 5 Service Groups shown each comprising a number of subscribers and each supplied through their own access hubs 220. As discussed above, these access hubs can be implemented in the form of a service gateway which can itself be implemented as a number n of QAM elements, or in other forms dependent on the type of access network. These QAMs are attached to switches in the core network which transmit the appropriate services from the upstream Video Server 200. In this example the system has only one such server. The network topology is formed of two rings connected by means of a switch. Service group 1, 1172 is connected by an access hub having a switch 1100, and service gateway 1170, respectively, to the second ring.

Service groups 2 and 3, 1177 and 1182 respectively, are coupled via respective access hubs. The second ring is accessible to the video server only via the first ring. Service groups 4 and 5 (1187, 1192) are connected via access hubs to the first ring only. The access hub for group 4 is shown as having a switch 1140, and a service gateway 1170. This can have a group of n QAMs 1185 for example, or can have other parts, to suit the type of access network. The video server is coupled to the first ring by switch 1160. The rings are coupled to each other by switch 1130. A resource manager 600 is coupled to control the video server. The whole system can be scaled to ensure that the SRM within the server will have full knowledge of all current services in play.

If an additional new service is requested by say a subscriber in Service Group 2 the SRM will assess the network state and will first ensure that the local network has QAM channel available to deliver the requested service. If this is so the server will then ensure that it has the content requested and that it has capacity to source the service. These two basic checks by the SRM allow the server and local distribution network to be sure that the resources are in place to fulfill the request. If either of these checks fails then the system returns a Service Unavailable message to the subscriber and may offer alternative services or an alternative time for the requested service to be delivered. If the SRM has no detailed knowledge of the delivery network then it will proceed to set up the service request and start to transmit the bit stream into the network regardless of whether the network has the capacity to support the new service at this time. The assumption will be that there is always enough capacity set aside by the provider to fulfill any request that the Video Server and QAM systems can support. This assumption can be made only if there is an excess of capacity available which comes at a cost which can be saved if the network is also manageable through the SRM.

If the network is characterised in terms of Stream Paths then the SRM can keep a running measure of how the set of current services in play are being delivered and how much capacity is being used. When, as is the case in this network example, there is more than one path from the Server to a QAM then flexibility is added to the network and alternative routes to the wanted QAM. In this example Steam Path 1 [SP1] comprises the first (lower) ring which carries all services to all QAMs and Stream Path 2 [SP2] comprises the second (upper) ring which takes services only to Service Groups 1 to 3 only. The capacities of these network segments will be known to the SRM and Service Groups 1-3 will need both SPs to complete delivery whereas Service Groups 4 and 5 only need SP1. Clearly the capacity of SP1 needs to be greater than that of SP2.

TABLE 1

| STREAM PATH | ALLOCATED CAPACITY (Mbps) | OCCU-PIED CA-PACITY | REACHABLE STREAM PATHS | REACHABLE SERVICE GROUPS |
|---|---|---|---|---|
| 1 | 70 | | 2 | 4, 5 |
| 2 | 30 | | — | 1, 2, 3 |

Table 1 lists the routes and capacities and associations between Service Groups, QAMs and SPs that may apply in the example of FIG. 11. This table can be an example of the model of the network, as it has all the information needed for the authorization steps by the resource manager. It can have a separate column for the occupation level of each stream path, and optionally other features such as priority level for each stream path.

FIG. 14 Example with More Complex Topology

Example 2 is illustrated by FIG. 14 where two Video Servers 200, 202 are allocated to supply four Service Groups fed via QAM sets numbered as in FIG. 13. Here the topology is different from the example of FIG. 11 above and is more flexible, in particular each Server is capable of reaching all Service Groups through the linked switches that support SP2 and SP4. SP1 delivers the output of Video Server 1 via switch 1200 to switch 1220 and SP3 delivers the output of Server 2 via switch 1210 to switch 1230. The QAM sets for service groups 1 and 2 are fed from switch 1220, and the QAM sets for service groups 3 and 4 are fed from switch 1230. Note there is one bidirectional link between switch 1220 and switch 1230. This is represented by two stream paths SP2 and SP4, one for each direction. Again the resource manager 600 is coupled to control the video servers. The resource manager models these SPs and integrates the allocation of service support in the network with that for the servers and QAM groups.

TABLE 2

| STREAM PATH | ALLOCATED CAPACITY (Mbps) | OCCU-PIED CA-PACITY | REACHABLE STREAM PATHS | REACHABLE SERVICE GROUPS |
|---|---|---|---|---|
| 1 | 100 | | 2 | 1, 2 |
| 2 | 50 | | — | 3, 4 |
| 3 | 100 | | 4 | 3, 4 |
| 4 | 50 | | — | 1, 2 |

Table 2 summarises the path capacities and also shows how each Service Group is reachable from either Video Server thus allowing trade off between the loading state of SP1 and SP3 through the existence of SP3 and SP4.

The use of the Stream Path concept enables many different network topologies to be represented in a simplified form such as a table. This helps enable the resource manager to manage resources in a third party core network in ways that do not require full integration with the network supplier's systems a feature that would be expensive to support. A particular benefit is the avoidance of congestion when services are launched without any such knowledge which could lead to conflict and disturbance to services already authorised. It also allows the reduction in the total network capacity required to support a given service load. The resource manager models for the SPs are suitable for upgrading existing service management parts used to control the video servers and QAM resources within the VOD system itself.

Other Features:

An interface between the core network and the video server may be provided by one or more modules such as: a 10 Gigabit Ethernet Module, a Gigabit Ethernet Module, a 10/100 BaseT Ethernet module, an ATM OC-3/STM-1 module, an ATM OC-12/STM-4 module, and so on. An interface to the access networks may be provided by for example a DVB-ASI module, a QAM 64 module, a QAM 256 module and so on. In a switched network, Ethernet or ATM is preferably used. Higher speed interfaces may be utilized in embodiments of the invention without changing the nature of the invention. The bandwidth of the video server may be proportional to the number of users the server is intended to serve.

A service manager may be provided in some cases to monitor and report on all currently active subscriber sessions and server streams. The SRM may be a part of this service manager or may be arranged as a separate entity cooperating with it. The service manager may report on currently active sessions and keep an archive on completed sessions to perform this monitoring. It can in some cases maintain detailed information of the nodes and links of the entire VOD system. Such topological information may include an inventory of the various components of the VOD system including access networks, service groups, core networks and the connectivity between them (i.e. the connection provided by the communication links). The manager may create logical groups of bandwidth, where a logical group of bandwidth may be defined as: one or more QAM channels, one or more service groups, one or more links in the core networks. Such information can be stored as a table or a graph, a linked listed, a hierarchical database, or some other data structure.

The service management module may provide an operator of the delivery network with the ability to modify the system topology table as needed to reflect additions, deletions or other changes of the VOD system. Such modifications may be made during scheduled maintenance windows or while the system is live to subscribers.

The service management module may monitor the bandwidth utilization and availability across all resources in the system. In particular it may track and record bandwidth utilization on the VOD server, the QAM channels, the service groups and any other logical groups of bandwidth, and any link between any node in the system. The information on bandwidth utilization may be obtained by polling devices in real time or by knowing the network topology and knowing what is being transmitted. Archived data on this bandwidth utilization may be viewed subsequently for system planning and trend analysis.

If a failure is detected on a particular link, such as a QAM channel in the system, the service manager may choose to avoid this path for some period of time. For example, the service manager may de-prioritize the faulty part and advise the operator of the system via an appropriate protocol such as Simple Network Management Protocol and/or through a Graphical User Interface and/or any other interface with the operator. The service manager might detect a failure in the particular link by noting a high error rate, or high demand for the retransmission of data. The transmission method of the video streams might include error detection and correction codes that would help in the detection of a failed link. The system may avoid using the de-prioritized link again until: the operator intervenes to resolve the underlying failure and then explicitly re-prioritizes the link, or until bandwidth is completely consumed on the other links feeding the service group for example.

Other variations and embodiments can be envisaged within the claims.

The invention claimed is:

1. A video on demand system comprising:
    plural video servers coupled to be able to transmit a requested video stream to a corresponding one of users over different routes through a core network and over access networks, the core network having transmission capacity of which a part is previously allocated to the video on demand system;
    a resource manager arranged to
        determine occupation information concerning how much of the previously allocated capacity of the core network is occupied by video streams already authorized for transmission, without obtaining such occupation information from the core network, and
        control a selected one of the plural video servers to transmit a new requested video stream according to the determined occupation information; and
    a store comprising a record of video streams currently being transmitted,
    wherein the resource manager is arranged to:
        determine from the record how much capacity of the core network is already occupied along a route of the new requested video stream through the core network, and
        select a route for one or more of the video streams through the core network in case that there is more than one possible route, the route selecting comprising selecting which of the plural video servers to use for the respective requested video stream.

2. The system of claim 1, the resource manager also being arranged to
    determine a current availability of capacity in the access network and in the plural video servers, and
    authorize the new requested video stream according to these determinations.

3. The system of claim 1,
    the resource manager being arranged to maintain a model of nodes and links between the nodes to represent the core network, the model indicating connectivity and capacity of the links, and
    the resource manager being arranged to use the model in determining the occupation information.

4. The system of claim 1, the resource manager being arranged to make the authorization according to any one or more of: a characteristic of the request, a parameter of the respective user, and other conditions of the system.

5. The system of claim 1, the access network comprising any of: a cable access network, a PSTN subscriber line based access network, and a wireless network.

6. The system of claim 1, wherein the core network is a mixed core network in which the video streams share the core network with other dynamic services.

7. The system of claim 3,
    the model comprising a stream path for each link, indicating the occupation information of that link, and which of the access networks or other stream paths can be reached from that link, and
    the resource manager being arranged to determine the occupation information of a possible route by reference to the stream paths making up the route.

8. The system of claim 3,
    at least some of the stream paths having a priority indication, and
    the resource manager being arranged to select from the possible routes according to the occupation information and the priority indications of the stream paths along the route.

9. A resource manager for a video on demand system, the system comprising plural video servers coupled to be able to transmit a requested video stream to a corresponding one of users over different routes through a core network and over access networks, the core network having transmission capacity previously allocated to the video on demand system; the resource manager comprising a processor arranged to
    determine occupation information concerning how much of the previously allocated capacity of the core network is occupied by video streams already authorized for transmission, without obtaining such occupation information from the core network;
    send a control signal to a selected of the plural video servers to cause transmission of a new requested video stream to a user according to the determined occupation information;
    determine, from a record of video streams currently being transmitted, how much capacity is already occupied along a route of the new requested video stream through the core network; and
    select a route for one or more of the video streams through the core network in the case that there is more than one possible route, the route selecting comprising selecting which of the plural video servers to use for the respective requested video stream.

10. The resource manager of claim 9, wherein the core network is a mixed core network in which the video streams share the core network with other dynamic services.

11. A method of operating a video on demand system, the system comprising plural video servers coupled to be able to transmit a requested video stream to a corresponding one of users over different routes through a core network and over access networks, the core network having transmission capacity previously allocated to the video on demand system, the method comprising:
 receiving a request from a user for a new video stream;
 determining, from a record of video streams currently being transmitted, occupation information concerning how much of the previously allocated capacity of the core network is occupied by video streams already authorised for transmission, without obtaining such occupation information from the core network;
 selecting a route for one or more of the video streams through the core network in the case that there is more than one possible route, the route selecting comprising selecting which of the plural video servers to use for the respective requested video stream; and
 sending a control signal to a selected one of the plural video servers to authorize transmitting the new requested video stream according to the occupation information.

12. The method of claim 11, further comprising maintaining a model of nodes and links between the nodes to represent the core network, the model indicating connectivity and capacity of the links, the model also comprising a stream path for each link, indicating the occupation information of that link, and which of the access networks or other stream paths can be reached from that link, and step of determining the occupation information of a possible route is carried out by reference to the stream paths making up the route.

13. A program stored on a non-transient machine readable medium, and having instructions which when executed by a processor, cause the processor to carry out the method of claim 11.

14. The method of claim 11, wherein the core network is a mixed core network in which the video streams share the core network with other dynamic services.

15. A method of using a video on demand system, the system comprising plural video servers coupled to be able to transmit a requested video stream to a corresponding one of users over different routes through a core network and over access networks, the core network having transmission capacity previously allocated to the video on demand system, and the method comprising:
 sending a request by a user for a new video stream to the system to cause the system to:
  determine, from a record of video streams currently being transmitted, occupation information concerning how much of the previously allocated capacity of the core network is occupied by video streams already authorised for transmission, without obtaining such occupation information from the core network,
  authorize the new video stream to be transmitted, according to the determined occupation information, and
  select a route for one or more of the video streams through the core network in the case that there is more than one possible route, the route selecting comprising selecting which of the plural video servers to use for the respective requested video stream; and
 receiving the authorized video stream from the system for presentation to the user.

16. The method of claim 15, wherein the core network is a mixed core network in which the video streams share the core network with other dynamic services.

17. A method of operating a resource manager of a video on demand (VOD) system, the VOD system comprising plural video servers coupled to a core network and plural service groups also coupled to the core network, the video servers being configured to transmit video streams to end users via the core network and the service groups, each end user being connected to an service group, the method comprising:
 determining, by the resource manager, one or more possible routes for delivery of a newly requested video stream, each possible route being from one of the video servers to a requesting end user via the core network and the service group connected to the requesting end user;
 for each possible route, determining, by the resource manager, an occupation information of that route, the occupation information being associated with an amount of transmission capacity of that route occupied due to video streams already authorized for transmission by the VOD system; and
 selecting, by the resource manager, one of the possible routes as a delivery route based on the occupation information of the one or more possible routes,
 wherein in the step of determining the occupation information, the occupation information is not obtained from the core network.

18. The method of claim 17,
 wherein in the step of determining the occupation information, the occupation information is determined in relation to a VOD capacity, and
 wherein the VOD capacity is a capacity of the core network previously allocated to the VOD system, the VOD capacity being less than a total capacity of the core network.

19. The method of claim 17, further comprising:
 modeling, by the resource manager, the core network as a collection of stream paths modeling a topology of the core network,
 wherein each stream path is associated with one of a link between a video server and a node in the core network, a link between two nodes in the core network, and a link between a node in the core network and a service group, and
 wherein each stream path is characterized by one or more of a bandwidth limit of that stream path, a list of service groups directly accessible via that stream path, and list of other stream paths directly accessible by that stream path.

20. The method of claim 19, wherein each stream path is in a single direction such that for any bidirectional link in the core network, the bidirectional link is modeled as two stream paths.

* * * * *